(12) United States Patent
Miyahara et al.

(10) Patent No.: US 9,671,002 B2
(45) Date of Patent: Jun. 6, 2017

(54) TORQUE CONVERTER HAVING TORSIONAL VIBRATION DAMPING DEVICE

(71) Applicant: TOYOTA JIDOSHA KABUSHIKI KAISHA, Toyota-shi (JP)

(72) Inventors: Yu Miyahara, Susono (JP); Husahiro Tsukano, Susono (JP); Atsushi Honda, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 52 days.

(21) Appl. No.: 14/731,973

(22) Filed: Jun. 5, 2015

(65) Prior Publication Data

US 2015/0377332 A1    Dec. 31, 2015

(30) Foreign Application Priority Data

Jun. 27, 2014  (JP) .................................. 2014-132002

(51) Int. Cl.
*F16H 45/02* (2006.01)

(52) U.S. Cl.
CPC ..... *F16H 45/02* (2013.01); *F16H 2045/0226* (2013.01); *F16H 2045/0263* (2013.01); *F16H 2045/0278* (2013.01)

(58) Field of Classification Search
CPC ............................................. F16H 2045/0263
See application file for complete search history.

(56) References Cited

U.S. PATENT DOCUMENTS

| | | | |
|---|---|---|---|
| 2012/0080281 A1 | 4/2012 | Takikawa et al. | |
| 2014/0048371 A1* | 2/2014 | Rossner | F16H 45/02 192/3.28 |
| 2015/0005078 A1 | 1/2015 | Sekiguchi et al. | |

FOREIGN PATENT DOCUMENTS

| | | |
|---|---|---|
| JP | 2012-77826 | 4/2012 |
| JP | 2012-77827 | 4/2012 |
| WO | WO 2013/161058 A1 | 10/2013 |

* cited by examiner

*Primary Examiner* — Mark Manley
(74) *Attorney, Agent, or Firm* — Oblon, McClelland, Maier & Neustadt, L.L.P.

(57) ABSTRACT

A torque converter in which a torsional vibration damping device is fastened firmly to a turbine hub in such a manner that a hermeticity test can be carried out easily. In the torque converter, a turbine runner is fixed to the turbine hub through a first rivet. The torsional vibration damping device is assembled as a unit independent from the turbine hub and a rolling mass is held in a casing liquid-tightly. The torsional vibration damping device and the driven member are fixed to the turbine hub through a second rivet.

12 Claims, 2 Drawing Sheets

TORQUE CONVERTER HAVING TORSIONAL VIBRATION DAMPING DEVICE

The present invention claims the benefit of Japanese Patent Application No. 2014-132002 filed on Jun. 27, 2014 with the Japanese Patent Office, the disclosure of which is incorporated herein by reference in its entirety.

BACKGROUND

Field of the Invention

The present invention relates to the art of a torque converter having a damping device that supresses torsional vibrations by a reciprocating motion of a rolling mass, and especially to a torque converter having a damping device in which the rolling mass is protected by oil applied to the torque converter.

Discussion of the Related Art

JP-A-2012-77826 describes a torque converter having a vibration absorber in which a rolling mass is held in a kidney-shaped guide hole formed on an outer circumferential side of a support member as a rotary plate while being allowed to be oscillated within the guide hole by torque pulses applied to the rotating plate. The torque converter is provided with a lockup clutch and a lockup damper aligned coaxially, and said vibration absorber is disposed therebetween. According to the teachings of JP-A-2012-77826, a driven member of the lockup damper and a turbine runner are connected to a turbine hub through a rivet, and the support member of the vibration absorber is connected to an intermediate member of the lockup damper through another rivet. In addition, the driven member of the lockup damper, the turbine runner and the support member are connected to the turbine hub through a common rivet.

JP-A-2012-77827 describes a torque converter in which a lockup clutch is arranged coaxially with a lockup damper, and an absorber device having a similar structure as said vibration absorber is disposed therebetween. According to the teachings of JP-A-2012-77827, an intermediate member of a lockup damper is connected to a support member of a vibration absorber through a rivet, and the intermediate member and the support member are also connected to the turbine hub through the same rivet. Further, another rivet connecting the turbine runner to the turbine hub is disposed on a radially outside of the turbine hub. WO2013/161058 also describes a vibration damping device arranged in a torque converter. According to the teachings of WO2013/161058, an area of the rotary member where a rolling member is held to oscillate is hermetically covered by a casing member. In the vibration damping device taught by WO2013/161058, a driven member of a lockup damper and a turbine runner are fixed to a hub connected through a single rivet.

Thus, according to the teachings of JP-A-2012-77826 and JP-A-2012-77827, the lockup dampers individually comprise the intermediate member connected to the drive member through a spring in addition to the drive member and the driven member, and the support member of the vibration absorber is connected to the intermediate member. In those torque converters, the turbine runner and the driven member are connected to the turbine hub by the rivet, and the support member is connected to the intermediate member by another rivet. However, a conventional spring damper does not have the intermediate member, and if such conventional spring damper is employed in the torque converter, all of the driven member, the support member and the turbine runner have to be connected to the turbine hub. Given that those three members are fastened to the turbine hub using a common rivet, a long shaft of the rivet is required. In this case, the rivet may be buckled or deformed unintentionally by an impact to expand a tail of the shaft thereby loosening a connection among those members.

According to a vibration damping device taught by WO2013/161058, an oscillating motion of the rolling member will not be disturbed by the oil in the torque converter so that vibration damping performance can be ensured. However, a long rivet is required to connect the housing and the support member to the turbine hub to seal the housing liquid-tightly. In addition, a hermeticity test of the housing has to be carried out after fixing the housing to the turbine hub, the driven member and the turbine hub and this makes difficult to perform the hermeticity test. Further, if a test result shows that the hermeticity is insufficient, usable members such as the turbine runner, the driven member and the lockup damper have to be replaced together with the housing.

The present invention has been conceived noting the foregoing technical problems, and it is therefore an object of the present invention is to provide a torque converter in which a hermeticity test of a torsional vibration damping device can be carried out easily, and in which a plurality of members including the torsional vibration damping device can be attached easily to a turbine hub.

SUMMARY OF THE INVENTION

The present invention relates to a torque converter having a torsional vibration damping device. The torque converter is comprised of: a turbine hub that is connected to a turbine runner; a driven member of a lockup damper that damps torque pulses transmitted through a lockup clutch; and a rolling mass that is held in a casing of the torsional vibration damping device sealed liquid-tightly in a manner to be oscillated by the torque pulses applied to the turbine hub. The driven member and the torsional vibration damping device are connected to the turbine hub. In order to achieve the above-explained objectives, according to the present invention, the turbine runner is fixed to the turbine hub through a first rivet, the torsional vibration damping device is assembled as a unit independent from the turbine hub, and the torsional vibration damping device and the driven member are fixed to the turbine hub through a second rivet.

The second rivet may be situated in a radially inner side of the first rivet.

The torsional vibration damping device comprises a rotary member engaged with the rolling mass in such a manner that the rolling mass is allowed to oscillate. In addition, the casing is fastened to the rotary member by a third rivet at radially outer side of the second rivet in a manner to hermetically cover at least an area of the rotary member where the rolling mass oscillates.

The second rivet comprises a shaft penetrating through the turbine hub, and a head that is formed at an end portion of the shaft to have a larger diameter than that of the shaft. In addition, the turbine hub comprises a flange and a depression formed on one of surfaces of the flange where the head of the second rivet is held therein, and a thrust bearing is disposed on an opening end of the depression.

Specifically, the opening end of the depression is closed by a closing plate, and the thrust bearing is disposed on an outer surface of the closing plate.

Thus, according to the present invention, the first rivet fastens only two members such as the turbine runner and the turbine hub, and the second rivet fastens only three members such as the torsional vibration damping device, the driven member of the lockup clutch and the turbine hub. For this reason, those rivets are not required to have a long shaft so that the above-mentioned members can be fastened firmly by those rivets. In addition, the torsional vibration damping device is assembled independent from the turbine hub to be sealed liquid-tightly. That is, a hermeticity test of the torsional vibration damping device can be performed while being disconnected from other members such as the turbine hub. If a test result shows that the hermeticity is insufficient, the torsional vibration damping device can be replaced or repaired independently. For this reason, a hermeticity test and maintenance of the torsional vibration damping device 2 can be carried out easy without replacing parts unnecessarily.

In the torque converter thus structured, the first rivet is involved in torque transmission between the turbine runner and the turbine hub, whereas the second rivet is involved in torque transmission between the lockup clutch and the turbine hub. This means that a torque applied to the second rivet is smaller than that applied to the first rivet. That is, although the second rivet is situated in the inner circumferential side of the first rivet, the second rivet can be prevented from being damaged by a large torque.

As described, the casing is fastened to the rotary member of the torsional vibration damping device by the third rivet so that the torsional vibration damping device can be sealed liquid-tightly independent from other members. Further, the shaft of each rivet can be shortened.

In addition, the head of the second rivet is held in the depression formed on the flange of the turbine hub in a manner not to cause an interference with the thrust baring disposed on the opening of the depression.

Optionally, the opening of the depression may be closed by the closing plate, and the thrust bearing may be disposed on the outer surface of the closing plate. In this case, the closing plate serves as a contact face to receive a thrust load so that so that the thrust bearing can be prevented from being damaged or deformed by the thrust load.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 3:
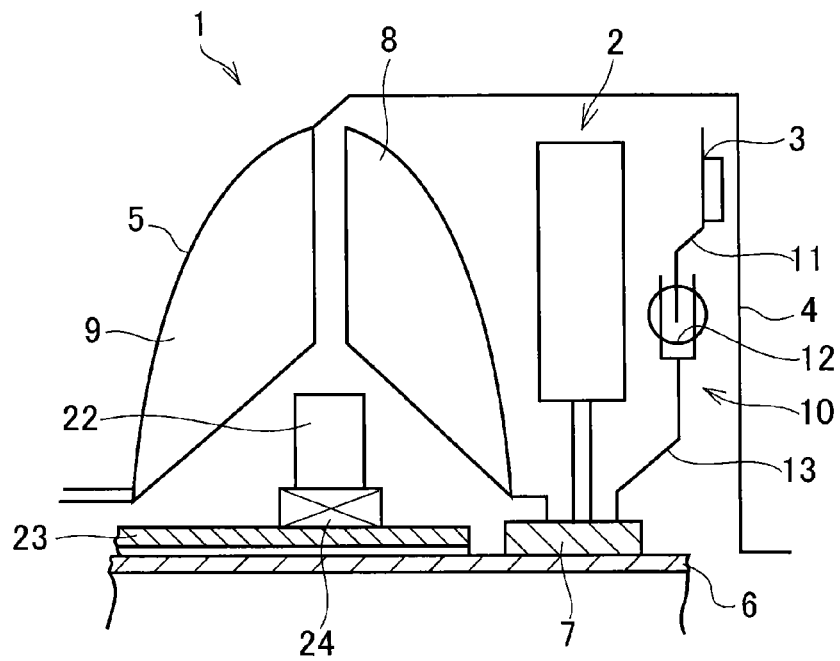
FIG. 3 is a view schematically showing an example of the torque converter according to the preferred example.

Turning first to FIG. 3, there is shown a torque converter 1 according to the preferred example having a torsional vibration damping device 2 and a lockup clutch 3, and a principle of vibration damping action of the torsional vibration damping device 2 is similar to those taught by the prior art documents cited in the background. A front cover 4 is connected to a pump shell 5 to form a housing of the torque converter 1, and an input shaft 6 (of a not shown transmission) penetrates through a center axis of the housing. A turbine hub 7 is fitted onto a leading end of the input shaft 6 to be rotated integrally therewith while being connected to a turbine runner 8, the lockup clutch 3, and the vibration torsional damping device 2.

As known in the conventional art, the turbine runner 8 is opposed to a pump impeller 9 to be rotated by a spiral oil flow created by the pump impeller 9. The lockup clutch 3 is hydraulically engaged with an inner face of the front cover 4 to enable torque transmission, and the torque transmission is disabled by reducing hydraulic pressure applied to the lockup clutch 3 to withdrawn the lockup clutch 3 from the front cover 4. The lockup clutch 3 is also connected to the turbine hub 7 through a lockup damper 10 adapted to absorb vibrations elastically. Specifically, the lockup damper 10 is comprised of a drive member 11 connected to the lockup clutch 3 and a driven member 13 connected not only to the drive member 11 through a coil spring 12 but also to the turbine hub 7. Both drive member 11 and driven member 13 are circular plate members.

Figure 1:
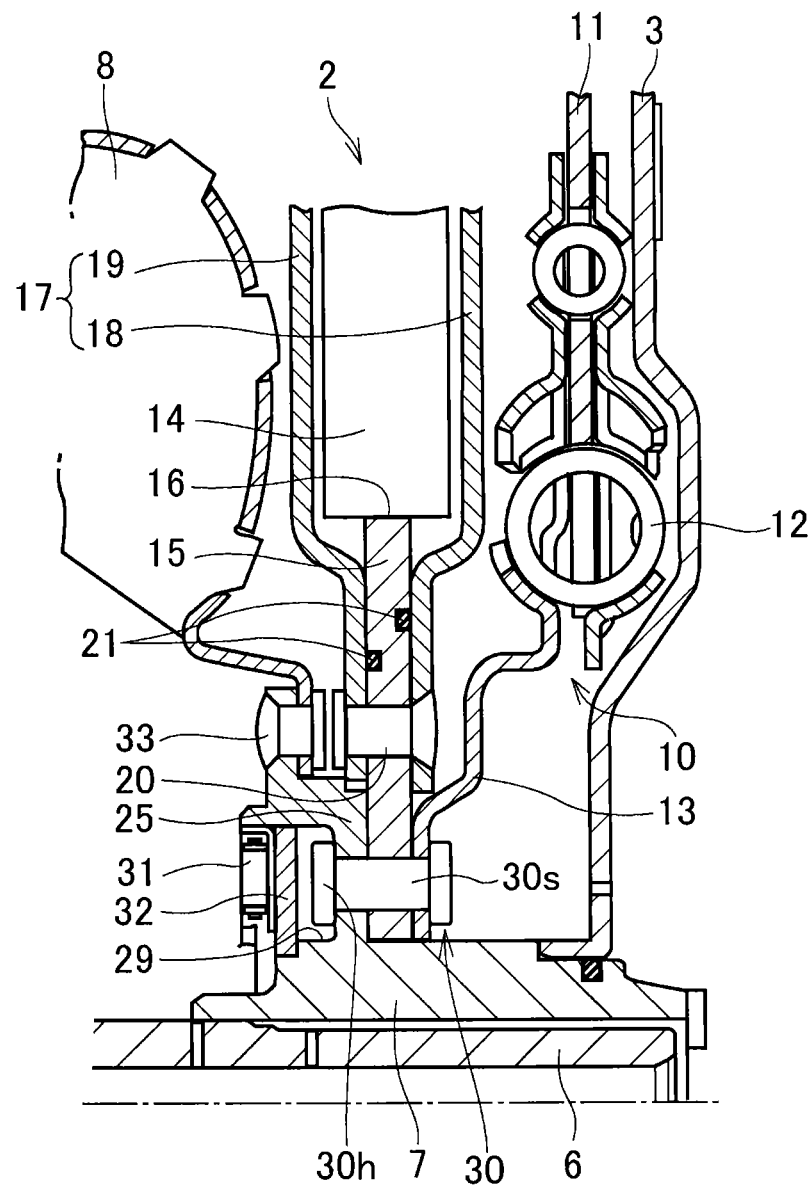
FIG. 1 is a cross-sectional view partially showing the turbine hub of the torque converter.

Turning now to FIG. 1, the torsional vibration damping device 2 is disposed between the turbine runner 8 and the lockup clutch 3 or the lockup damper 10. In the torsional vibration damping device 2, a rolling mass 14 is held in a disk shaped rotary member 15. A plurality of guide holes 16 are formed on radially outer side of the rotary member 15 at substantially regular intervals in a circumferential direction. The rolling mass 14 is formed into a column shape or disk shape having diametrically larger flange portions on both thickness ends, and held in each guide hole 16 while being engaged with an edge of the guide hole 16. That is, the rolling mass 14 is allowed to oscillate within the guide hole 16 without causing disengagement. Structures of the guide hole and the rolling mass, and number of those elements are described in more detail in the prior art documents JP-A-2012-77826, JP-A-2012-77827 and WO2013/161058.

In order not to disturb an oscillating motion of the rolling mass 14 by oil, a radially outer portion of the rotary member 15 where the pendulum mass 14 are held is covered liquid-tightly by a casing 17. Specifically, the casing 17 is comprised of a pair of first casing member 18 and second casing member 19, and radially outer portions of those casing members 18 and 19 are individually expanded in an axial direction in a manner to hold the rolling mass 14 without being contacted therewith. A radially outer end portion of the first casing member 18 is bent to be connected to that of the second casing member 19, and those end portions are welded to each other.

A radially outer portion of the rotary member 15 is clamped by inner circumferential portions of the first and the second casing members 18 and 19 and fastened by a third rivet 20 axially penetrating through those members. In order to protect the pendulum mass 14 from the oil, a sealing member 21 is individually interposed between each surface of the rotary member 15 and the first and the second casing member 18 and 19. Thus, the torsional vibration damping device 2 is independent from the turbine hub 7 to be sealed liquid-tightly. For this reason, the hermeticity test of the torsional vibration damping device 2 can be performed while being disconnected from other members such as the turbine hub 7.

As illustrated in FIG. 3, a stator 22 is disposed between the pump impeller 9 and the turbine runner 8 in an inner circumferential side of those members. The stator 22 is engaged to a fixed shaft 23 also fitted onto the input shaft 6 through a one-way clutch 24.

The installation of the turbine runner 8, the torsional vibration damping device 2 and the driven member 13 to the turbine hub 7 will be explained hereinafter. Specifically, the turbine hub 7 is a cylindrical member and splined onto the input shaft 6. The lockup clutch 3 is splined onto a leading end (i.e., right end in FIG. 1) of the turbine hub 7 in a manner to slightly reciprocate in the axial direction and to rotate integrally therewith. The turbine hub 7 is provided with a flange 25 formed around a rear end (i.e., left side in FIG. 1) thereof. Specifically, the flange 25 is comprised of a thicker flange 26 of radially inner portion, and a thinner flange 27 of radially outer portion. The torsional vibration damping device 2 and the driven member 13 of the lockup damper 10 are connected to the turbine hub 7 at the thicker flange 26, and turbine runner 8 is connected to the turbine hub 7 at the thinner flange 27.

Figure 2:
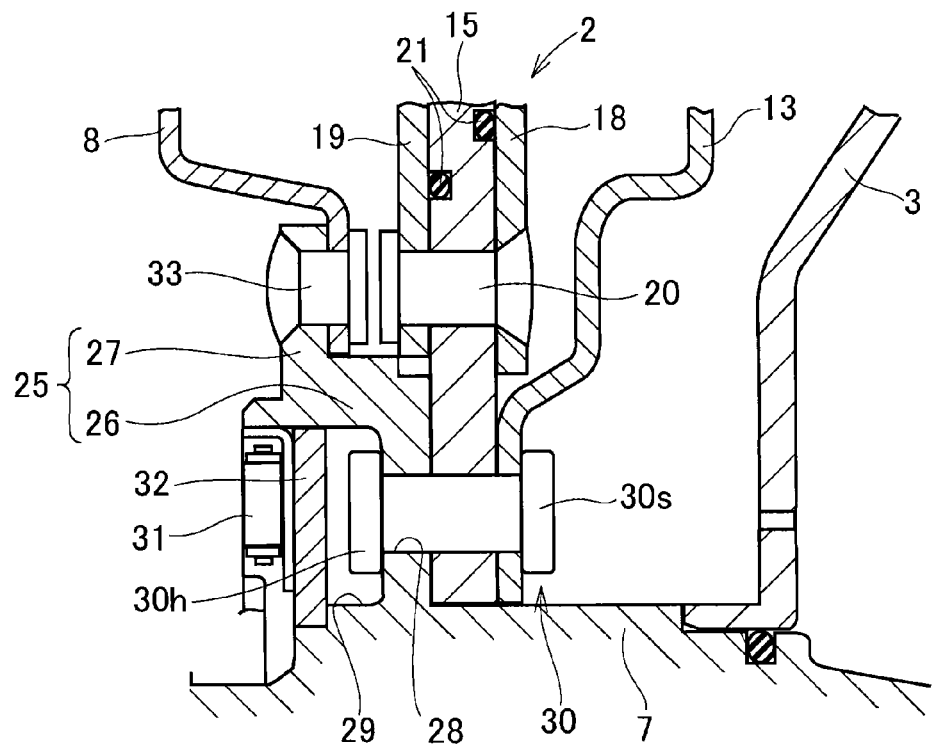
FIG. 2 is a close-up showing a connection between each member and the turbine hub.

Referring now to FIG. 2, there is shown the flange 25 in an enlarged scale, and as illustrated in FIG. 2, a through hole 28 penetrates through the thicker flange 26 in the axial direction. One of the openings (of rear end of the turbine hub 7, i.e., left side in FIG. 2) of the through hole 28 is enlarged to form a depression 29. One of surfaces of inner circumferential portion of the rotary member 15 is brought into contact to a surface of the thicker flange 26 of the lock-up clutch 3 side, and the other surface of inner circumferential portion of the rotary member 15 is brought into contact to an inner circumferential portion of the driven member 13 of the lockup damper 10. That is, the thicker flange 26, the rotary member 15 and the driven member 13 are overlapped in the axial direction. In order to fasten the rotary member 15 and the driven member 13 to the thicker flange 26 of the turbine hub 7, for example, a second rivet 30 may be inserted into the through hole 28 from the depression 29 to penetrate through those members, and a tail of a shaft 30s of the second rivet 30 is expanded by applying a compressive load thereto. In this case, a head 30h of the second rivet 30 that is diametrically larger than the shaft 30s is held in the depression 29. Alternatively, the second rivet 30 may also be inserted into the through hole 28 from the driven member 13 side. In this case, the tail of the shaft 30s is expanded in the depression 29 to be diametrically larger than the shaft 30s.

In order to fix axial positions of the one-way clutch 24 and the stator 22 by receiving thrust loads therefrom, a thrust bearing 31 is arranged to close the depression 29. To this end, the thrust bearing 31 may be engaged directly to an opening end of the depression 29. According to the preferred example, however, the depression 29 is closed by an annular closing plate 32, and the thrust bearing 31 is disposed on an outer surface of the closing plate 32. That is, a surface of the closing plate 32 serves as a contact face to receive the thrust load. For this reason, the thrust bearing 31 will not be subjected to an abnormal load so that the thrust bearing 31 can be prevented from being damaged.

An inner circumferential end of the turbine runner 8 is attached to the thinner flange 27 formed on the thicker flange 26 in the rear end side of the turbine hub 7 (i.e., in the turbine runner 8 side) by a first rivet 33. That is, the second rivet 30 is situated radially inner side of the first rivet 33, and the first rivet 33 is situated at a position not to cause an interference with the third rivet 20 arranged coaxially therewith to fasten the casing members 18 and 19 to the rotary member 15.

Next, an example of a procedure for connecting the torsional vibration damping device 2, the lockup clutch 3 and the turbine runner 8 to the turbine hub 7 will be explained hereinafter. First of all, the torsional vibration damping device 2 is assembled in advance by covering the area of the rotary member 15 holding the rolling mass 14 liquid-tightly by the casing 17, independently from the lockup damper 10 and the turbine runner 8. Specifically, the area of the rotary member 15 holding the rolling mass 14 is covered by the casing members 18 and 19, and the sealing member 21 is respectively interposed to seal each contact portion therebetween. Then, the first casing member 18, the rotary member 15 and the second casing member 19 are fastened together by the third rivet 20. In this situation, the torsional vibration damping device 2 is still separated from the turbine hub 7 etc. so that the hermeticity test of the torsional vibration damping device 2 can be carried out independently. If a test result shows that the hermeticity is insufficient, the torsional vibration damping device 2 can be replaced or repaired independently. Thus, a hermeticity test, a replacement, and a maintenance of the torsional vibration damping device 2 can be carried out easy at this phase.

Prior to fixing the torsional vibration damping device 2 to the turbine hub 7, the inner circumferential end of the turbine runner 8 is fixed to the thinner flange 27 of the turbine hub 7 by inserting the first rivet 33 into those members and then expanding the tail of the first rivet 33 by applying an axial compressive load thereto. Thereafter, the inner circumferential portions of the rotary member 15 and the driven member 13 of the lockup damper 10 are overlapped onto the thicker flange 26, and fastened together by inserting the second rivet 30 into the through hole and expanding the tail of the second rivet 30 by applying an axial compressive load thereto. Consequently, the torsional vibration damping device 2 is fixed to the turbine hub 7, and in this situation, the head 30h of the second rivet 30 is held in the depression 29. Then, the depression 29 is closed by fitting the closing plate 32 into the opening edge of the depression 29, and the thrust bearing 31 is tightly brought into contact to the closing plate 32.

Thus, the second rivet 30 fastens only three members such as thicker flange 26, the rotary member 15 and the driven member 13, and hence a long shaft of the second rivet 30 is not required. For this reason, strength of the second rivet 30 can be ensured sufficiently so that the torsional vibration damping device 2 can be fixed firmly to the turbine hub 7. Likewise, strengths of the first rivet 33 and the third rivet 20 may also be ensured sufficiently by the same reason. Especially, a required length of the second rivet 30 can be reduced by thus forming the depression 29 so that the fastening strength of the rivet 30 can be further improved.

In the torque converter 1 thus structured, a multiplied input torque to the torque converter 1 is applied to the first rivet 33 fixing the turbine runner 8 to the turbine hub 7, whereas only an input torque is applied to the second rivet 30 fastening the driven member 13 at a maximum. For this reason, although the second rivet 30 is situated in the inner circumferential side of the turbine hub 7, the second rivet 30 can be prevented from being damaged by a large torque.

Although the above exemplary embodiments of the present invention have been described, it will be understood by those skilled in the art that the present invention should not be limited to the described exemplary embodiments, but that various changes and modifications can be made within the spirit and scope of the present invention. For example, the rolling mass of the torsional vibration damping device 2 may be supported by a linkage mechanism to perform an oscillating motion.

What is claimed is:
1. A torque converter having a torsional vibration damping device, comprising:
 a turbine hub that is connected to a turbine runner;
 a driven member of a lockup damper that damps torque pulses transmitted through a lockup clutch; and a rolling mass that is held in a casing of the torsional vibration damping device sealed liquid-tightly in a manner to be oscillated by the torque pulses applied to the turbine hub;

wherein the driven member and the torsional vibration damping device are connected to the turbine hub;

wherein the turbine runner is fixed to the turbine hub through a first rivet;

wherein the torsional vibration damping device comprises a rotary member;

wherein the torsional vibration damping device is assembled as a unit independent from the turbine hub; and wherein the rotary member and the driven member are directly fixed to the turbine hub through a second rivet.

2. The torque converter having a torsional vibration damping device as claimed in claim 1, wherein the second rivet is situated in a radially inner side of the first rivet.

3. The torque converter having a torsional vibration damping device as claimed in claim 1, wherein the rotary member is engaged with the rolling mass in such a manner that the rolling mass is allowed to oscillate, and wherein the casing is fastened to the rotary member by a third rivet at radially outer side of the second rivet in a manner to hermetically cover at least an area of the rotary member where the rolling mass oscillates.

4. A torque converter having a torsional vibration damping device, comprising:

a turbine hub that is connected to a turbine runner;

a driven member of a lockup damper that damps torque pulses transmitted through a lockup clutch; and a rolling mass that is held in a casing of the torsional vibration damping device sealed liquid-tightly in a manner to be oscillated by the torque pulses applied to the turbine hub, wherein the driven member and the torsional vibration damping device are connected to the turbine hub, wherein the turbine runner is fixed to the turbine hub through a first rivet, wherein the torsional vibration damping device is assembled as a unit independent from the turbine hub, wherein the torsional vibration damping device and the driven member are fixed to the turbine hub through a second rivet, wherein the second rivet comprises a shaft penetrating through the turbine hub, and a head that is formed at an end portion of the shaft to have a larger diameter than that of the shaft, wherein the turbine hub comprises a flange and a depression formed on one of surfaces of the flange where the head of the second rivet is held therein, and wherein a thrust bearing is disposed on an opening end of the depression.

5. The torque converter having a torsional vibration damping device as claimed in claim 4, wherein the opening end of the depression is closed by a closing plate, and wherein the thrust bearing is disposed on an outer surface of the closing plate.

6. The torque converter having a torsional vibration damping device as claimed in claim 2, wherein the rotary member is engaged with the rolling mass in such a manner that the rolling mass is allowed to oscillate, and wherein the casing is fastened to the rotary member by a third rivet at radially outer side of the second rivet in a manner to hermetically cover at least an area of the rotary member where the rolling mass oscillates.

7. The torque converter having a torsional vibration damping device as claimed in claim 2, wherein the second rivet comprises a shaft penetrating through the turbine hub, and a head that is formed at an end portion of the shaft to have a larger diameter than that of the shaft, wherein the turbine hub comprises a flange and a depression formed on one of surfaces of the flange where the head of the second rivet is held therein, and wherein a thrust bearing is disposed on an opening end of the depression.

8. The torque converter having a torsional vibration damping device as claimed in claim 3, wherein the second rivet comprises a shaft penetrating through the turbine hub, and a head that is formed at an end portion of the shaft to have a larger diameter than that of the shaft, wherein the turbine hub comprises a flange and a depression formed on one of surfaces of the flange where the head of the second rivet is held therein, and wherein a thrust bearing is disposed on an opening end of the depression.

9. The torque converter having a torsional vibration damping device as claimed in claim 6, wherein the second rivet comprises a shaft penetrating through the turbine hub, and a head that is formed at an end portion of the shaft to have a larger diameter than that of the shaft, wherein the turbine hub comprises a flange and a depression formed on one of surfaces of the flange where the head of the second rivet is held therein, and wherein a thrust bearing is disposed on an opening end of the depression.

10. The torque converter having a torsional vibration damping device as claimed in claim 7, wherein the opening end of the depression is closed by a closing plate, and wherein the thrust bearing is disposed on an outer surface of the closing plate.

11. The torque converter having a torsional vibration damping device as claimed in claim 8, wherein the opening end of the depression is closed by a closing plate, and wherein the thrust bearing is disposed on an outer surface of the closing plate.

12. The torque converter having a torsional vibration damping device as claimed in claim 9, wherein the opening end of the depression is closed by a closing plate, and wherein the thrust bearing is disposed on an outer surface of the closing plate.

* * * * *